United States Patent
Gil et al.

(10) Patent No.: US 8,313,874 B2
(45) Date of Patent: Nov. 20, 2012

(54) STRUCTURE OF SOLID OXIDE FUEL CELL

(75) Inventors: Jae Hyoung Gil, Seoul (KR); Jae Hyuk Jang, Gyunggi-do (KR); Kyong Bok Min, Gyunggi-do (KR); Sung Han Kim, Seoul (KR); Eon Soo Lee, Gyeongsangbuk-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 380 days.

(21) Appl. No.: 12/610,118

(22) Filed: Oct. 30, 2009

(65) Prior Publication Data

US 2011/0053046 A1    Mar. 3, 2011

(30) Foreign Application Priority Data

Aug. 31, 2009  (KR) .................. 10-2009-0081190

(51) Int. Cl.
*H01M 8/12* (2006.01)
(52) U.S. Cl. ........................................................ 429/497
(58) Field of Classification Search .................. None
See application file for complete search history.

(56) References Cited

U.S. PATENT DOCUMENTS

| | | | | |
|---|---|---|---|---|
| 4,888,254 A | * | 12/1989 | Reichner | 429/465 |
| 6,551,735 B2 | * | 4/2003 | Badding et al. | 429/486 |
| 2011/0027685 A1 | * | 2/2011 | Lee et al. | 429/483 |

FOREIGN PATENT DOCUMENTS

JP       2003-297388        10/2003

* cited by examiner

*Primary Examiner* — Jonathan Crepeau
(74) *Attorney, Agent, or Firm* — Blakely Sokoloff Taylor & Zafman LLP

(57) ABSTRACT

Disclosed is a structure of a solid oxide fuel cell, including a porous tubular anode support having a plurality of through holes, and an electrolyte layer and a cathode layer sequentially formed on the inner surface of the tubular anode support, so that fuel flows via the plurality of through holes and air flows through the inside of the cathode layer, thus increasing a diffusion rate of fuel and air to thereby increase the reaction rate, resulting in excellent cell performance. This structure eliminates the flow of fuel and air around the outside of the fuel cell, thus preventing the formation of an oxidizing atmosphere at the inside and outside of the tubular cell, thereby increasing lifespan of the cell and ensuring cell reliability.

4 Claims, 4 Drawing Sheets

STRUCTURE OF SOLID OXIDE FUEL CELL

CROSS REFERENCE TO RELATED APPLICATION

This application claims the benefit of Korean Patent Application No. 10-2009-0081190, filed Aug. 31, 2009, entitled "Solid oxide fuel cell structure", which is hereby incorporated by reference in its entirety into this application.

BACKGROUND OF THE INVENTION

1. Technical Field

The present invention relates to a structure of a solid oxide fuel cell.

2. Description of the Related Art

As environmental pollution gradually increases, global warming problems are becoming more serious. For this reason, the Kyoto protocol was adopted in 1997 in order to set guidelines for the reduction of carbon dioxide emission and to handle energy-related environmental problems in earnest. Thus, fuel cell technology which exhibits high cell performance and is environmentally friendly is receiving renewed attention.

A fuel cell is a device for directly converting the chemical energy of fuel (hydrogen, LNG, LPG, etc.) and air into electric power and heat using an electrochemical reaction. Unlike conventional techniques for generating power including combusting fuel, generating steam, driving a turbine and driving a power generator, the fuel cell neither undergoes a combustion procedure nor requires an operator and is thus regarded as a novel power generation technique which results in high cell performance without being accompanied by any concomitant environmental problems. The fuel cell discharges very small amounts of air pollutants such as SOx and NOx and also generates a small amount of carbon dioxide and is thus a pollution-free power generator, and is furthermore advantageous in terms of producing very little noise and not causing any vibrations.

The fuel cell includes for example a phosphoric acid fuel cell (PAFC), an alkaline fuel cell (AFC), a polymer electrolyte membrane fuel cell (PEMFC), a direct methanol fuel cell (DMFC), a solid oxide fuel cell (SOFC) and so on. In particular, the SOFC exhibits high power generation efficiency because of low overvoltage based on activation polarization and low irreversible loss. Furthermore, the SOFC is advantageous because various types of fuel, such as hydrogen, carbon and a hydrocarbon, may be used, and also because the reaction rate at the electrodes is high, thus obviating the need to use an expensive noble metal as an electrode catalyst. Moreover, the temperature of the heat generated during power generation is very high, and thus the heat is very usable. In addition, heat generated from the SOFC is used to reform fuel and may also be utilized as an energy source for industrial purposes or for air cooling in a cogeneration system. Hence, the SOFC is essential for realizing the hydrogen-based society of the future.

In accordance with the operating principle of the SOFC, the SOFC typically generates power through the oxidation of hydrogen or carbon monoxide, and the reactions at the anode and cathode are represented by Reaction 1 below.

Reaction 1
Anode:

$$H_2+O^{2-}\rightarrow H_2O+2e$$

$$CO+O^{2-}\rightarrow CO_2+2e$$

Cathode:

$$O_2+4e\rightarrow 2O^{2-}$$

Overall Reaction:

$$H_2+1/2O_2\rightarrow H_2O$$

In the above reactions, electrons are delivered to the cathode through an external circuit, and simultaneously the oxygen ion generated at the cathode is transferred to the anode through an electrolyte. At the anode, hydrogen or carbon monoxide is combined with the oxygen ion, thus producing electrons and water or carbon dioxide.

Many attempts have been made to improve the structure of the SOFC in order to inhibit the oxidation of the material to thereby more efficiently exhibit cell performance over a long period of time. Examples of the structure of a conventional SOFC include a planar type, a tubular type, a flat tubular type, a honeycomb type, a delta type, etc. The structures thereof are classified into a cathode-supported structure and an anode-supported structure depending on whether the support is made of a cathode material or an anode material.

In the case of a general cathode-supported tubular fuel cell, while air flows through the inside of the tubular cell and fuel flows around the outside of the tubular cell, an electrochemical reaction ensues. Such a cathode-supported tubular fuel cell is problematic in that the cathode material is expensive, but is advantageous because the outside atmosphere of the tubular cell is a hydrogen atmosphere and thus a current collector such as a nickel pelt, an interconnector and so on may not be oxidized, resulting in extended cell lifespan and reliability.

However, when a support is made using a comparatively inexpensive cathode material, hydrogen fuel passes through the inside of the tubular cell and air flows around the outside of the tubular cell, so that a current collection material outside the tubular cell is oxidized when the cell is operated for a long time. In order to prevent this problem, an expensive current collection material is required.

Japanese Unexamined Patent Publication No. 2003-297388 discloses a fuel cell structure in which an electrode is disposed inside the tubular cell and a plurality of holes is formed in an anode, thus supplying fuel through the holes. Although this structure may improve the collection of current, it suffers from the above-mentioned oxidation problem and the cell lifespan similar to that of the conventional cell structure.

SUMMARY OF THE INVENTION

Accordingly, the present invention has been made keeping in mind the problems related to the oxidation of an SOFC in the related art and is intended to provide a novel structure of an anode-supported SOFC which exhibits high cell performance and an extended lifespan.

Also the present invention is intended to provide a novel structure of a cathode-supported SOFC.

An aspect of the present invention provides a tubular SOFC, including a porous tubular anode support having a plurality of through holes formed to enable fuel to flow in a longitudinal direction thereof, an electrolyte layer disposed on an inner surface of the tubular anode support, and a cathode layer disposed on an inner surface of the electrolyte layer.

In this aspect, a fuel impermeable anode layer may be formed on an outer surface of the tubular anode support.

In this aspect, the tubular SOFC has a cross-section of any one shape selected from the group consisting of a circular shape, a polygonal shape and a rounded rectangular shape.

In this aspect, the tubular SOFC having a cross-section of the rounded rectangular shape may have one or more bridges formed at the cathode layer.

In this aspect, the plurality of through holes of the anode support may extend in an axial longitudinal direction of the tubular SOFC and may have a honeycomb shape in cross-section.

Another aspect of the present invention provides a tubular SOFC, including a porous tubular cathode support having a plurality of through holes formed to enable fuel to flow in a longitudinal direction thereof, an electrolyte layer disposed on an inner surface of the tubular cathode support, and an anode layer disposed on an inner surface of the electrolyte layer.

In this aspect, an air impermeable cathode layer may be formed on an outer surface of the tubular cathode support.

In this aspect, the tubular SOFC may have a cross-section of any one shape selected from the group consisting of a circular shape, a polygonal shape and a rounded rectangular shape.

In this aspect, the tubular SOFC having a cross-section of the rounded rectangular shape may have one or more bridges formed at the anode layer.

In this aspect, the plurality of through holes of the cathode support may extend in an axial longitudinal direction of the tubular SOFC and may have a honeycomb shape in cross-section.

BRIEF DESCRIPTION OF THE DRAWINGS

The features and advantages of the present invention will be more clearly understood from the following detailed description taken in conjunction with the accompanying drawings, in which.

DESCRIPTION OF SPECIFIC EMBODIMENTS

Hereinafter, a detailed description will be given of embodiments of the present invention with reference to the accompanying drawings.

The present invention provides a novel structure of an SOFC having high cell performance because it solves problems related to the oxidation of a material in a conventional structure of an SOFC.

Figure 1:
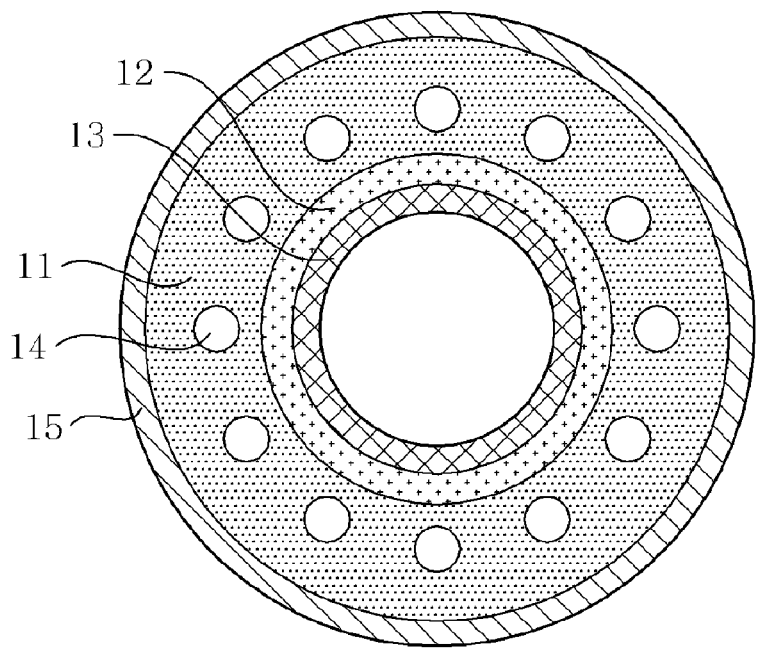
FIG. 1 is a transverse cross-sectional view schematically showing an anode-supported tubular SOFC according to the present invention.

FIG. 1 is a transverse cross-sectional view schematically showing an anode-supported cylindrical SOFC according to the present invention. With reference to this drawing, the anode-supported cylindrical SOFC according to the present invention is formed by using a porous tubular anode as a support.

A conventional SOFC is typically configured such that an electrolyte layer and an electrode layer are sequentially formed on the outer surface of a support layer. In the present invention, however, the SOFC is configured such that an electrolyte layer 12 is formed on the inner surface of an anode support 11 and a cathode layer 13 is formed on the inner surface of the electrolyte layer 12. This anode-supported cylindrical SOFC has an air flow passage formed inside of the cathode layer 13, and is thus different from a general anode-supported cylindrical oxide fuel cell in which fuel flows in the tubular cell.

The cathode is typically made of a Perovskite type oxide. Particularly useful is lanthanum strontium manganite $(La_{0.84}Sr_{0.16})MnO_3$ having high catalytic performance and high electronic conductivity. Oxygen is converted into the oxygen ion through the catalytic action of $LaMnO_3$. The Perovskite type oxide containing the transition metal has both ionic conductivity and electronic conductivity, and thus is efficiently used in the cathode. However, Perovskite other than the manganite may cause a chemical reaction with YSZ used in the electrolyte, undesirably creating a concern about the deterioration of performance of the electrode. In particular, $LaCoO_3$-based Perovskite is a material having high electrode catalyst activity but it chemically reacts with YSZ and has a different coefficient of thermal expansion, and thus is considered to be a material which is inappropriate for use in an electrode. Except for these materials which have just been mentioned, the cathode may be made of any other type of material which is appropriate for use therein.

The anode may be made of metal nickel/oxide ion conductor cermet. The metal nickel has high electronic conductivity and adsorbs hydrogen and hydrocarbon fuel, thus exhibiting excellent electrode catalyst activity. Compared to platinum and so on, nickel is inexpensive and therefore an advantageous electrode material. In the case of an SOFC operating at high temperature, a material (Ni/YSZ cermet) obtained by sintering nickel oxide power containing 40~60% zirconia power may be used. However, the present invention is not limited to this material.

Because a solid oxide electrolyte has lower ionic conductivity than that of a liquid electrolyte such as an aqueous solution or a molten salt, it reduces voltage drop due to resistance polarization and should thus be formed as thin as possible. As such, however, small clearances, pores or decants may undesirably be formed. Hence, the solid oxide electrolyte requires homogeneity, density, heat resistance, mechanical strength and stability, as well as ionic conductivity. The material for the electrolyte may include but is not limited to yttria-stabilized zirconia (YSZ) in which yttria $(Y_2O_3)$ is dissolved to about 3 ~10% in zirconia $(ZrO_2)$.

The porous anode support 11 has a plurality of holes 14 formed to enable the flow of fuel in a longitudinal direction thereof. Because it is not sufficient to supply fuel only through the pores, the provision of the through holes 14 enables fuel to flow into the tubular fuel cell.

A fuel impermeable anode layer 15 may be further applied on the exposed outer surface of the porous anode support 11. When the fuel impermeable anode layer 15 is formed in this way, outflow of the fuel through the porous anode support 11 may be prevented.

The plurality of through holes 14 formed in the porous anode support 11 may be formed in a longitudinal direction of the support 11, and the cross-section thereof may have a rounded rectangular shape, a circular shape, etc. In addition, the plurality of through holes may have a honeycomb shape in cross-section.

Although the cylindrical fuel cell is illustrated in FIG. 1, any tubular shape, for example, a tetragonal prism shape, a trigonal prism shape, a hexagonal prism shape, or a flat tubular shape, may be used.

Figure 2:
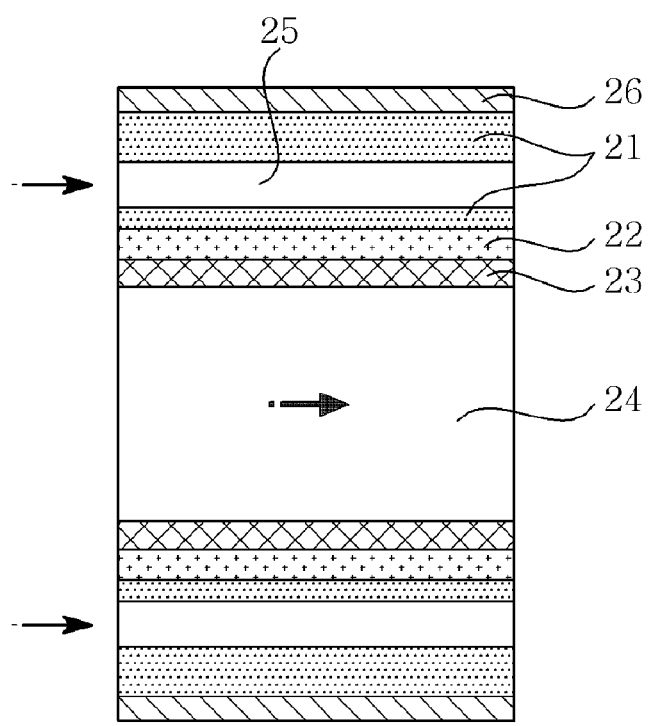
FIG. 2 is a longitudinal cross-sectional view schematically showing an anode-supported tubular SOFC according to the present invention.

FIG. 2 is a longitudinal cross-sectional view showing the anode-supported cylindrical fuel cell. As mentioned above, this fuel cell is configured such that an electrolyte layer 22 and a cathode layer 23 are sequentially applied on the inner surface of an anode support 21, and an air flow passage 24 is formed in the center thereof.

As shown in FIG. 2, through holes 25 are formed in the anode support 21, thus enabling the supply of fuel along the through holes 25.

Also, a fuel impermeable anode layer 26 is applied on the outer surface of the anode support 21, thus preventing the loss of fuel.

Therefore, the structure of the anode-supported SOFC according to the present invention may exhibit the same effect as that of a typical cathode-supported tubular fuel cell in which air is supplied into the tubular cell. Specifically, according to the present invention, an oxidizing atmosphere is formed only inside the tubular cell, without being formed on the outside of the tubular cell where current is collected, considerably preventing the oxidation of the material.

Furthermore, a comparatively inexpensive anode support material may be used to achieve the above effect, thus generating financial benefits.

Figure 3:
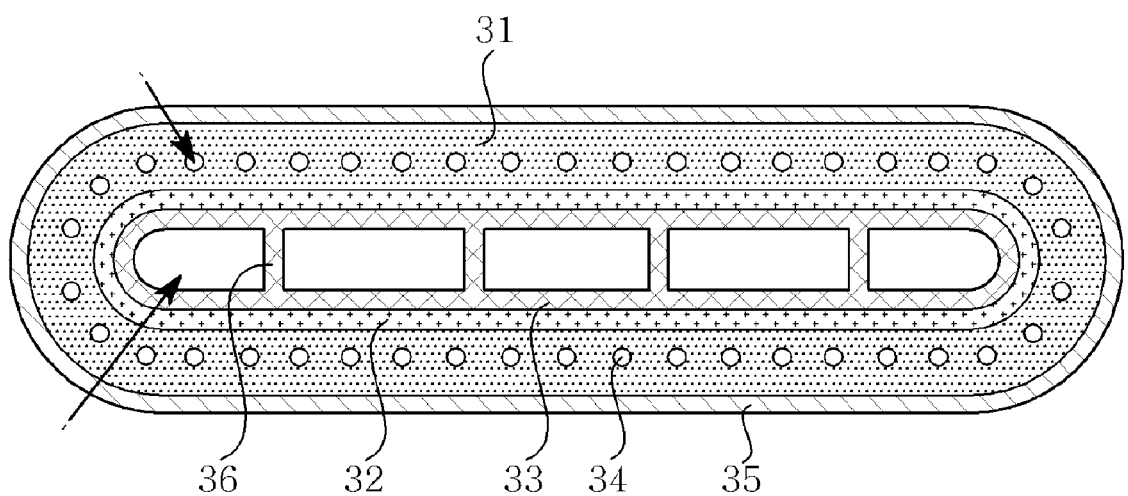
FIG. 3 is a transverse cross-sectional view schematically showing an anode-supported flat tubular SOFC according to the present invention.

FIG. 3 is a transverse cross-sectional view schematically showing an anode-supported flat tubular SOFC according to the present invention. The fundamental structure thereof is the same as that of the anode-supported cylindrical SOFC which was described above. Specifically, the flat tubular SOFC is configured such that an electrolyte layer 32 is formed on the inner surface of an anode support 31 and a cathode layer 33 is formed on the inner surface of the electrolyte layer 32. The anode support 31 is porous, and has a plurality of through holes 34 enabling the flow of fuel.

Further, a fuel impermeable anode layer 35 may be applied on the outer surface of the anode support 31 in order to prevent the outflow of fuel.

Also, in order to impart an additional supporting force to the flat tubular structure when in a fuel cell stack, a plurality of bridges 36 which extend from the cathode layer may be formed.

Conventional flat tubular fuel cells are problematic because one side thereof is not used upon stacking. However, the flat tubular fuel cell according to the present invention is advantageous because both fuel and air flow in the fuel cell, both sides thereof may be used.

Figure 4:
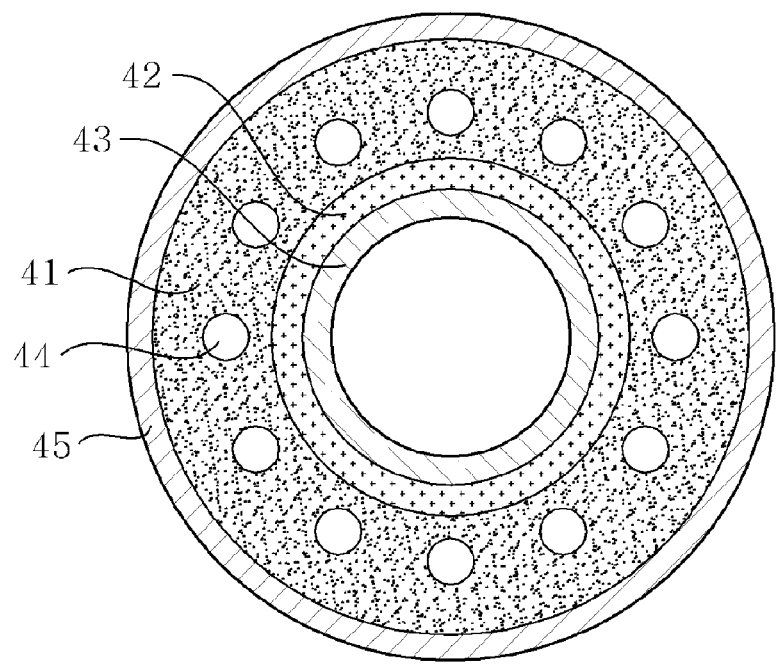
FIG. 4 is a transverse cross-sectional view schematically showing a cathode-supported tubular SOFC according to the present invention.

FIG. 4 is a transverse cross-sectional view schematically showing a cathode-supported tubular SOFC according to the present invention.

The cathode-supported tubular SOFC according to the present invention allows the flow of both fuel and air into the fuel cell.

In the case of a typical cathode-supported tubular fuel cell configured such that an electrolyte layer and an anode layer are sequentially formed on the outer surface of a cathode support, air flows through the inside of the fuel cell, whereas fuel is supplied from the outside.

However, with reference to FIG. 4, the cathode-supported tubular SOFC according to the present invention is configured such that an electrolyte layer 42 is applied on the inner surface of a cathode support 41 and an anode layer 43 is applied on the inner surface of the electrolyte layer 42.

The cathode support 41 is porous and has a plurality of through holes 44 enabling the flow of air. The through holes 44 enable the fuel which flows outside a conventional cylindrical fuel cell to flow in the fuel cell by traveling through the support.

Further, an air impermeable cathode layer 45 may be applied on the outer surface of the cathode support 41. The air impermeable cathode layer 45 prevents air from leaking to the outside of the fuel cell and efficiently diffuses air to the electrolyte layer 42 from the porous support 41.

Hence, an oxidizing atmosphere is not formed in the anode and the cathode, thus collecting current using an inexpensive material and reducing the risk for oxidation. As the oxidation decreases, cell durability and lifespan may be increased.

Figure 5:
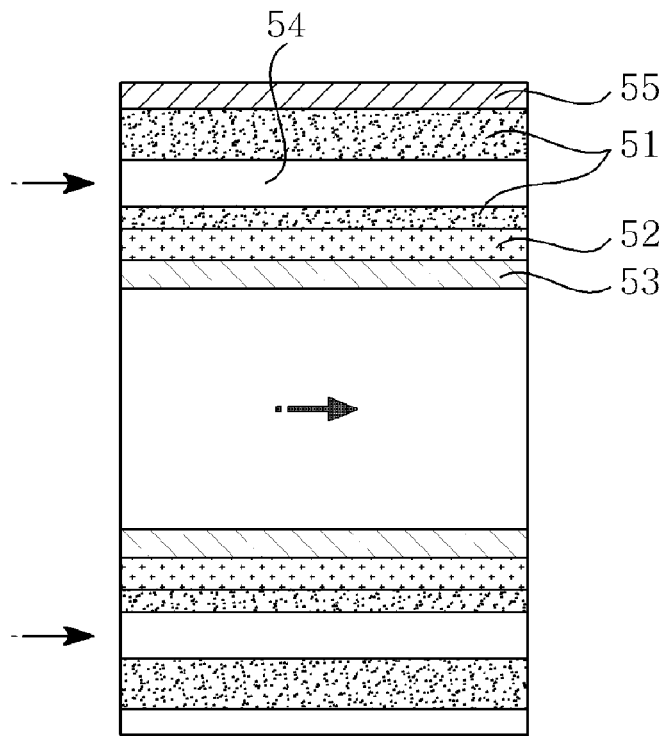
FIG. 5 is a longitudinal cross-sectional view schematically showing a cathode-supported tubular SOFC according to the present invention.

FIG. 5 is a longitudinal cross-sectional view schematically showing a cathode-supported tubular SOFC according to the present invention.

As mentioned above, the cathode-supported tubular SOFC is configured such that an electrolyte layer 52 is applied on the inner surface of a cathode support 51 and an anode layer 53 is applied on the inner surface of the electrolyte layer 52. Thus, fuel flows through the inside of the anode 53, and air flows along a plurality of through holes 54 formed in the cathode support 51, thus causing a reaction, resulting in current being produced.

An air impermeable cathode layer 55 may be further applied on the outer surface of the cathode support 51, so that air may be more efficiently diffused to the electrolyte layer 52 through the porous cathode support 51.

As mentioned above, fuel and air do not flow outside the cathode-supported cylindrical fuel cell according to the present invention. In particular, because air does not flow outside the fuel cell, problems related to the oxidation may be solved.

In a conventional tubular fuel cell, air flows out of the tubular cell and infiltrates a porous support, thus causing the electrochemical reaction of the fuel cell. However, in the cathode-supported tubular fuel cell according to the present invention, air directly flows through the inside of the cathode support, thus increasing the diffusion rate of air to thereby increase the reaction rate, resulting in excellent cell performance.

Although the cylindrical fuel cell is described as above, the structure of the fuel cell according to the present invention may be applied to any type of tubular fuel cell, the cross-section of which may be circular, polygonal or rounded rectangular.

Figure 6:
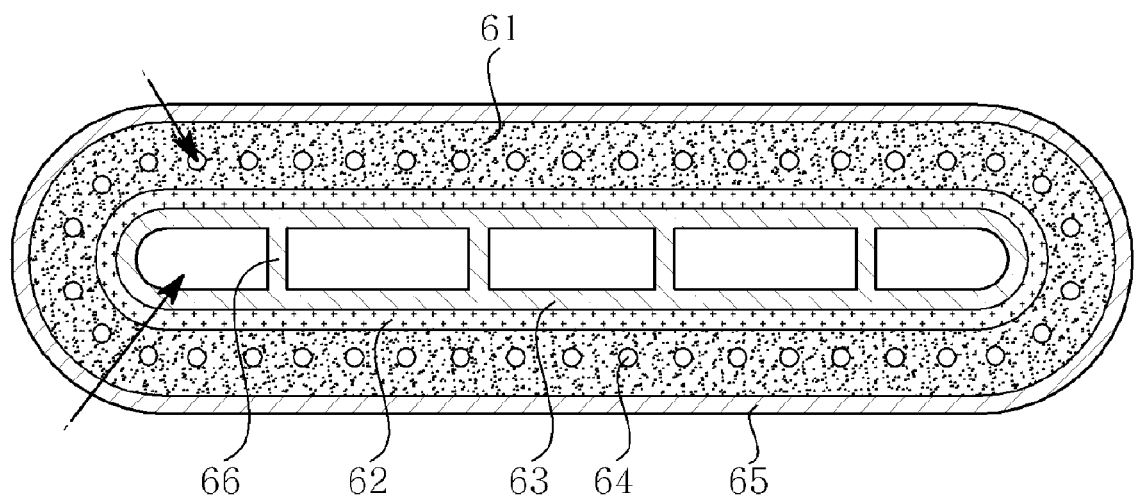
FIG. 6 is a transverse cross-sectional view schematically showing a cathode-supported flat tubular SOFC according to the present invention.

FIG. 6 is a transverse cross-sectional view schematically showing a cathode-supported flat tubular SOFC according to the present invention.

This fuel cell has the same structure as that of the cathode-supported cylindrical SOFC described above. Specifically, the flat tubular SOFC is configured such that an electrolyte layer 62 is applied on the inner surface of a cathode support 61 and an anode layer 63 is formed on the inner surface of the electrolyte layer 62. The cathode support 61 is porous and has a plurality of through holes 64 enabling the flow of air.

Also, an air impermeable cathode layer 65 may be further applied on the outer surface of the cathode support 61 in order to prevent the outflow of air.

Also, in order to impart an additional supporting force to the flat tubular structure when in a fuel cell stack, a plurality of bridges 66 which extend from the anode layer may be formed.

Conventional flat tubular fuel cells are problematic because one side thereof is not used upon stacking. However, the flat tubular fuel cell according to the present invention is advantageous because both fuel and air may flow in the fuel cell, and thus both sides thereof may be used.

Figure 7:
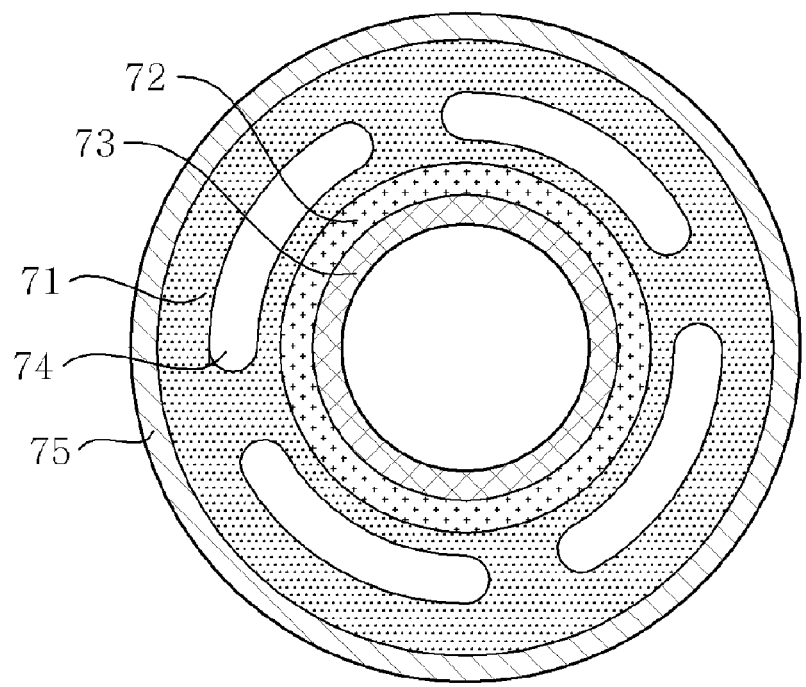
FIGS. 7 and 8 are cross-sectional views showing the through holes of the tubular SOFC according to the present invention.
Figure 8:
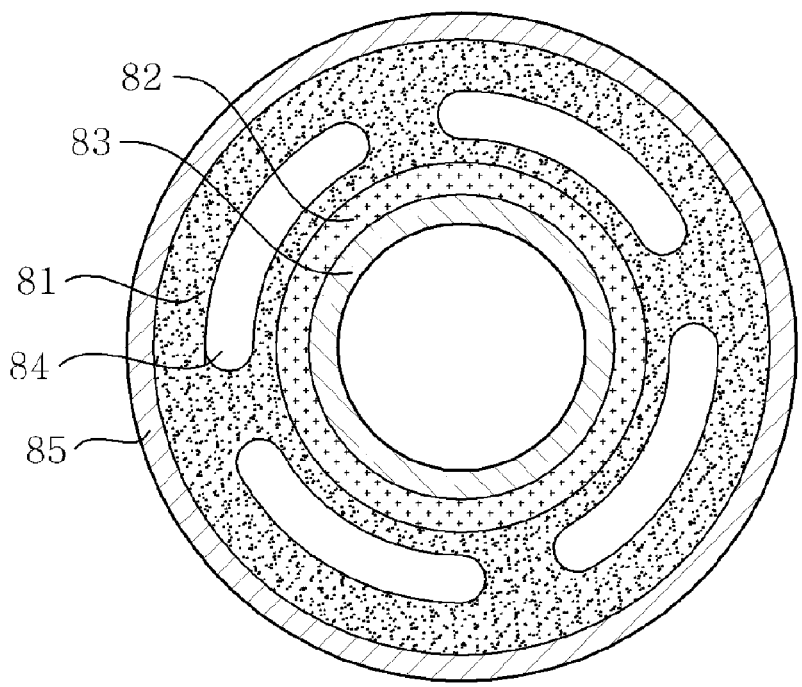

FIGS. 7 and 8 illustrate the through holes of the tubular SOFCs according to the present invention.

FIG. 7 shows an anode-supported tubular fuel cell. As in the anode-supported tubular fuel cell according to the present invention described above, an electrode layer 72 and a cathode layer 73 are sequentially applied on the inner surface of an anode support 71. The porous anode support 71 has a plurality of through holes 74 having a cross-section of a rounded rectangular shape corresponding to the shape of the cross-section of the porous anode support 71 divided into quarters. In this case, it is possible to more easily supply fuel. Also, a fuel impermeable anode layer 75 may be formed on the outer surface of the anode support 71.

FIG. 8 shows a cathode-supported tubular fuel cell. As in the cathode-supported tubular fuel cell according to the present invention described above, an electrode layer 82 and an anode layer 83 are sequentially applied on the inner surface of a cathode support 81. Like the description of FIG. 7, through holes 84 have a specific shape which enables air to be more easily supplied. Further, an air impermeable cathode layer 85 may be formed on the outer surface of the cathode support 81.

Because both fuel and air are supplied into the fuel cell and thus react with each other, the outside atmosphere of the fuel cell may be an inert gas atmosphere. In this case, the oxidation of a current collector, an outer electrode and so on may be prevented.

As described hereinbefore, the present invention provides a structure of an SOFC. According to the present invention, the structure of the SOFC causes fuel and air to be more efficiently diffused, thus increasing the reaction rate, resulting in excellent cell performance. Furthermore, both the inside atmosphere and the outside atmosphere of the tubular cell are not oxidizing atmospheres, thus achieving an extended cell lifespan and ensuring cell reliability.

Although the embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood as falling within the scope of the present invention.

What is claimed is:

1. A tubular solid oxide fuel cell, comprising:
a porous tubular anode support having a plurality of through holes formed to enable fuel to flow in a longitudinal direction thereof;
an electrolyte layer disposed on an inner surface of the tubular anode support;
a cathode layer disposed on an inner surface of the electrolyte layer; and
a fuel impermeable anode layer formed on an outer surface of the tubular anode support.

2. The tubular solid oxide fuel cell as set forth in claim 1, wherein the tubular solid oxide fuel cell has a cross-section of any one shape selected from the group consisting of a circular shape, a polygonal shape and a rounded rectangular shape.

3. The tubular solid oxide fuel cell as set forth in claim 2, wherein the tubular solid oxide fuel cell having a cross-section of the rounded rectangular shape has one or more bridges formed at the cathode layer.

4. The tubular solid oxide fuel cell as set forth in claim 1, wherein the plurality of through holes of the anode support extends in an axial longitudinal direction of the tubular solid oxide fuel cell and has a honeycomb shape in cross-section.

* * * * *